US009008473B2

(12) United States Patent
Yoshida et al.

(10) Patent No.: US 9,008,473 B2
(45) Date of Patent: Apr. 14, 2015

(54) OPTICAL TRANSMISSION-RECEPTION SYSTEM AND LIGHT-RECEIVING UNIT

(71) Applicants: Haruhiko Yoshida, Chiba (JP); Kazuya Ohira, Tokyo (JP); Mizunori Ezaki, Kanagawa (JP)

(72) Inventors: Haruhiko Yoshida, Chiba (JP); Kazuya Ohira, Tokyo (JP); Mizunori Ezaki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 205 days.

(21) Appl. No.: 13/692,241

(22) Filed: Dec. 3, 2012

(65) Prior Publication Data
US 2013/0259420 A1    Oct. 3, 2013

(30) Foreign Application Priority Data

Mar. 29, 2012    (JP) ................................. 2012-077742

(51) Int. Cl.
*G02B 6/12*    (2006.01)
*G02B 6/43*    (2006.01)
*G02B 6/125*   (2006.01)
*G02B 6/293*   (2006.01)

(52) U.S. Cl.
CPC .............. *G02B 6/12* (2013.01); *G02B 6/12007* (2013.01); *G02B 6/43* (2013.01); *G02B 6/12004* (2013.01); *G02B 6/125* (2013.01); *G02B 6/29343* (2013.01); *G02B 2006/12119* (2013.01)

(58) Field of Classification Search
USPC .......... 385/14, 28, 30, 32, 129, 131; 398/140, 398/141, 202, 214
See application file for complete search history.

(56) References Cited

U.S. PATENT DOCUMENTS

| | | | | |
|---|---|---|---|---|
| 5,109,446 A | * | 4/1992 | Kaltschmidt | 385/24 |
| 5,394,239 A | * | 2/1995 | Valette | 356/481 |
| 5,398,256 A | * | 3/1995 | Hohimer et al. | 372/94 |
| 5,825,799 A | * | 10/1998 | Ho et al. | 372/92 |
| 6,978,067 B2 | | 12/2005 | Herbert et al. | |
| 7,164,812 B2 | * | 1/2007 | Depeursinge et al. | 385/12 |
| 7,764,852 B2 | * | 7/2010 | Ty Tan et al. | 385/50 |
| 7,889,956 B2 | * | 2/2011 | Beausoleil et al. | 385/14 |
| 8,483,527 B2 | * | 7/2013 | Mandorlo et al. | 385/32 |
| 8,761,549 B2 | * | 6/2014 | Rasigade et al. | 385/2 |

FOREIGN PATENT DOCUMENTS

JP    2010-535356    11/2010

OTHER PUBLICATIONS

Japanese Office Action issued Jun. 24, 2014, in Japan Patent Application No. 2012-077742 (with English translation).

* cited by examiner

*Primary Examiner* — Daniel Petkovsek
(74) *Attorney, Agent, or Firm* — Oblon, McClelland, Maier & Neustadt, L.L.P.

(57) ABSTRACT

An optical transmission-reception system includes: a light-emitting element having a first semiconductor multilayer structure with a ring- or disk-like shape and generating a first optical signal and a second optical signal rotating in a direction opposite to the first optical signal; a first optical waveguide optically coupled with the light-emitting element and propagating the first optical signal; a second optical waveguide optically coupled with the light-emitting element and propagating the second optical signal; and a light-receiving element having a second semiconductor multilayer structure with a ring- or disk-like shape, optically coupled with the first and second optical waveguides, and optically receiving the first and second optical signals. The first optical waveguide has a spiral shape at a coupling part with the light-receiving element, and the second optical waveguide has a spiral shape winding in the same direction as the first optical waveguide at a coupling part with the light-receiving element.

18 Claims, 5 Drawing Sheets

OPTICAL TRANSMISSION-RECEPTION SYSTEM AND LIGHT-RECEIVING UNIT

CROSS-REFERENCE TO RELATED APPLICATION

This application is based upon and claims the benefit of priority from Japanese Patent Application No. 2012-077742, filed on Mar. 29, 2012, the entire contents of which are incorporated herein by reference.

FIELD

Embodiments described herein relate generally to an optical transmission-reception system and a light-receiving unit.

BACKGROUND

Along with recent increase in integration density of LSIs, internal circuit patterns have been scaled-down further. This scaling-down causes reduction of cross sectional area of wiring transmitting signals, thereby increasing the wiring resistance, and moreover causes the space between the adjacent wirings to reduce, thereby increasing the inter-wiring capacitance.

As a result, the wiring delay (or propagation delay) time determined by the wiring resistance and the wiring capacitance increases, which makes it difficult to further increase the operating speed of LSIs. Furthermore, along with core multiplication and the three-dimensional integration of memory in the LSIs, signal propagation in a large amount of capacities between the cores or between the core and the memory has become essential. Thus, the signal propagation speed via electricity is the bottleneck against the higher performance of the LSIs.

As a technique for solving the problem with wiring delay caused along with the increase in density of LSIs, an optical interconnection (optical wiring) technique in which an electric signal is replaced by an optical signal has been attracting attention. The optical interconnection technique is a technique for propagating signals using an optical waveguide instead of using a metal wiring, and can be expected to achieve higher-speed operation because the aforementioned increase in wiring resistance or inter-wiring capacitance due to the scaling-down does not occur.

In a semiconductor laser (LD) used as a light source in the optical interconnection technique, an element conventionally used in optical communication has a width of several micrometers and a length of hundred micrometers, which is extremely huge as compared with a transistor or a wiring pitch of an LSI. This interrupts the replacement of electric wiring with optical interconnection. In view of this, a microring laser including a microring resonator as a compact light source has recently been attracting attention.

For achieving the optical interconnection on an LSI chip, it is necessary to form an optical transmission-reception system by integrating compactly a light-receiving element (reception part) together with a light-emitting element (transmission part) as a light source, and an optical waveguide (propagation part) in addition to a driver circuit and an amplifier circuit on the same chip.

Since a microring laser provides light rays rotating in different directions in a resonator, it is difficult to stably extract and transmit (or propagate) only one light ray as an output. Even though only one light ray can be extracted stably, the loss would increase by the amount of the other light ray.

DETAILED DESCRIPTION

Figure 1:
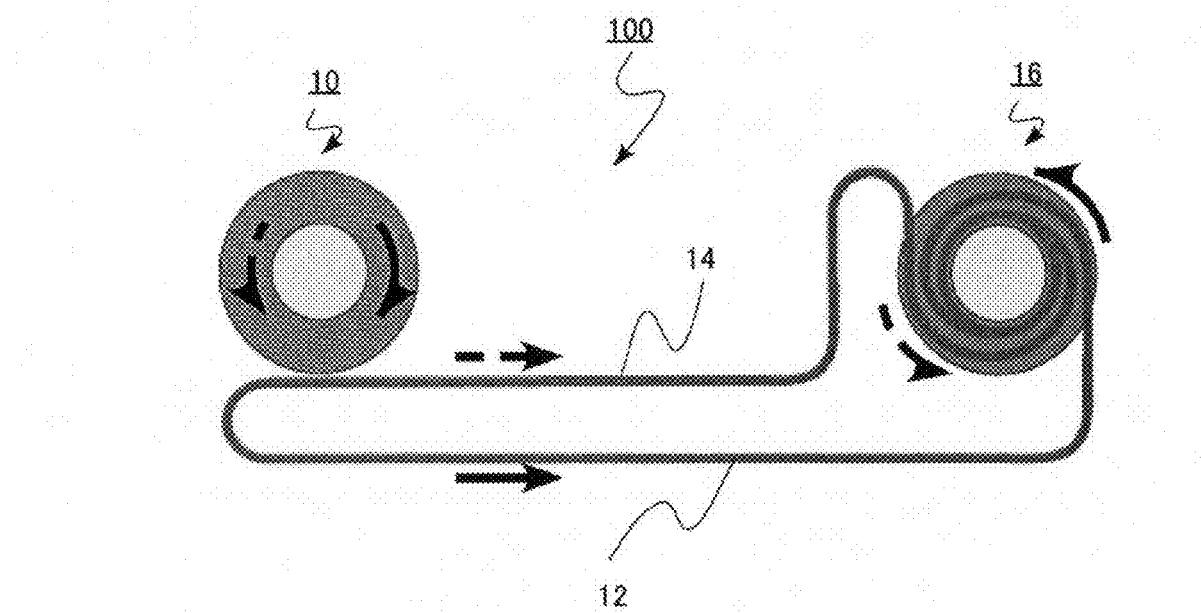
FIG. 1 is a schematic view of an optical transmission-reception system according to a first embodiment.

An optical transmission-reception system according to embodiments includes: a light-emitting element having a first semiconductor multilayer structure with a ring- or disk-like shape and generating a first optical signal rotating in the first semiconductor multilayer structure and a second optical signal rotating in a direction opposite to the first optical signal in the first semiconductor multilayer structure; a first optical waveguide optically coupled with the light-emitting element and propagating the first optical signal; a second optical waveguide optically coupled with the light-emitting element and propagating the second optical signal; and a light-receiving element having a second semiconductor multilayer structure with a ring- or disk-like shape, optically coupled with the first and second optical waveguides, and optically receiving the first and second optical signals. The first optical waveguide has a spiral shape at a coupling part with the light-receiving element, and the second optical waveguide has a spiral shape that rotates in the same direction as the first optical waveguide at a coupling part with the light-receiving element.

A transmission-reception system and a light-receiving unit according to the embodiments are described below with reference to drawings.

Note that the drawings are schematic and conceptual, and the relation between thickness and width of each part, the ratio of the size between the parts, and the like are not necessarily the same as those of the actual one. Moreover, the same part might be illustrated with a different size or ratio depending on the drawing.

In this specification, the ring shape is not limited to the shape whose outer or inner circumferential shape is circular, and includes all the shapes as long as the shape is closed as a ring. For example, the shape may be elliptical, or the shape may be formed by combining a straight line and a curved line.

First Embodiment

An optical transmission-reception system according to this embodiment includes: a light-emitting element having a first semiconductor multilayer structure with a ring- or disk-like shape and generating a first optical signal rotating in the first semiconductor multilayer structure and a second optical signal rotating in a direction opposite to the first optical signal in the first semiconductor multilayer structure; a first optical waveguide optically coupled with the light-emitting element and propagating the first optical signal; a second optical waveguide optically coupled with the light-emitting element and propagating the second optical signal; and a light-receiving element having a second semiconductor multilayer structure with a ring- or disk-like shape, optically coupled with the first and second optical waveguides, and optically receiving the first and second optical signals. The first optical waveguide has a spiral shape at a coupling part with the light-receiving element, and the second optical waveguide has a spiral shape that rotates in the same direction as the first optical waveguide at a coupling part with the light-receiving element.

With the above structure, the optical transmission-reception system according to this embodiment performs optical transmission and reception by utilizing both bidirectional optical signals generated in the light-emitting element with a ring- or disk-like shape. Therefore, the loss in the light-emitting element is suppressed. As compared with the case of using only unidirectional optical signals, the intensity of optical signals propagated to the light-receiving element is increased and stabilized. Accordingly, the output of the electric signal at the light-receiving element is increased and stabilized.

FIG. 1 is a schematic view of the optical transmission-reception system according to this embodiment. An optical transmission-reception system 100 includes a light-emitting element 10, a first optical waveguide 12, a second optical waveguide 14, and a light-receiving element 16. The optical transmission-reception system 100 employs an optical interconnection technique in which an electric signal is replaced by an optical signal.

The light-emitting element 10 has a first semiconductor multilayer structure with a ring-like shape. The light-emitting element 10 is a microring laser employing a microring resonator. For example, the light-emitting element 10 is a semiconductor laser of direct modulation type in which an electric signal is directly input between electrodes of an optical resonator having the first semiconductor multilayer structure for modifying the laser light intensity.

The light-emitting element 10 receives the electric signal propagated from an LSI chip and converts the electric signal into an optical signal, for example. The light-emitting element 10 generates a first optical signal rotating clockwise (solid-line arrow in the drawing) in the first semiconductor multilayer structure and a second optical signal rotating inversely to the first optical signal, i.e., counterclockwise, (dotted-like arrow in the drawing) in the first semiconductor multilayer structure, for example.

The first optical waveguide 12 is optically coupled with the light-emitting element 10. The first optical signal rotating clockwise in the light-emitting element 10 is output to the first optical waveguide 12 and propagates therein. The second optical waveguide 14 is optically coupled with the light-emitting element 10. The second optical signal rotating counterclockwise in the light-emitting element 10 is output to the second optical waveguide 14 and propagates therein.

Each of the first and second optical waveguides 12 and 14 is formed using silicon and a silicon oxide film surrounding this silicon, for example.

The light-receiving element 16 has a second semiconductor multilayer structure with a ring-like shape. In the optical transmission-reception system 100, the first semiconductor multilayer structure and the second semiconductor multilayer structure have the same layer structure. Accordingly, the light-emitting element 10 and the light-receiving element 16 can be formed on the same substrate through the same process.

The light-receiving element 16 is optically coupled with the first and second optical waveguides 12 and 14 at the coupling part. Thus, the input first optical signal and second optical signal are absorbed and converted into an electric signal. The converted electric signal is transferred to an LSI chip, for example.

Figure 2:
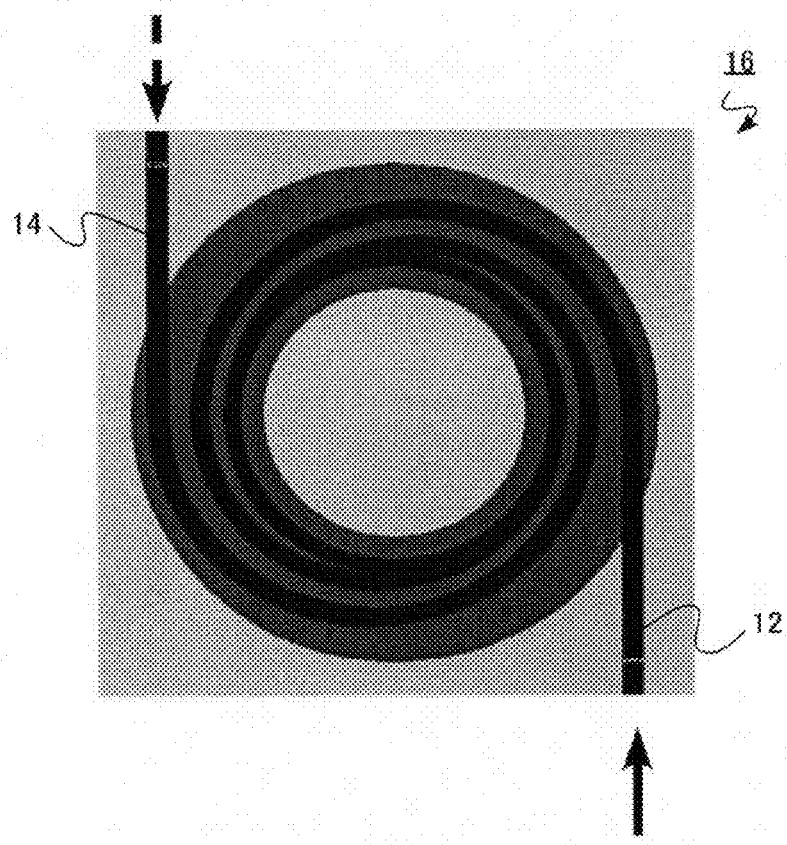
FIG. 2 is a schematic view of a coupling part between a light-receiving element and first and second optical waveguides according to the first embodiment.

FIG. 2 is a schematic view of the coupling part between the light-receiving element and the first and second optical waveguides according to this embodiment. As depicted, the first optical waveguide 12 has a spiral shape at the coupling part with the light-receiving element 10. Similarly, the second optical waveguide 14 has a spiral shape winding in the same direction as the first optical waveguide 12 at the coupling part with the light-receiving element 10. The light-receiving unit according to this embodiment in which the optical waveguides include two spiral shapes at the coupling part is called a double-cyclone type light-receiving unit.

When the first and second optical waveguides 12 and 14 are wound in the spiral shape in this manner, the effective light absorption length can be increased and the absorption efficiency can be improved. Moreover, as depicted in FIG. 2, an end part of the spiral shape of each of the first optical waveguide 12 and the second optical waveguide 14 preferably has a ring-like shape because this makes the first and second optical signals input to the light-receiving element 16 rotate in the ring-like part, thereby suppressing the loss of light.

Moreover, as depicted in FIG. 2, the first and second optical waveguides 12 and 14 preferably intersect with each other at the coupling part with the light-receiving element. This is because this structure can facilitate the formation of the first and second optical waveguides 12 and 14 in the same layer. Moreover, by winding the first and second optical waveguides 12 and 14 in the same direction, even though the two optical waveguides intersect with each other, the outgoing of light from the other optical waveguide can be suppressed.

Moreover, each of the first optical waveguide 12 and the second optical waveguide 14 has a line width which becomes narrower toward an end at the coupling part with the light-receiving element. This can suppress the loss of light.

Figure 3:
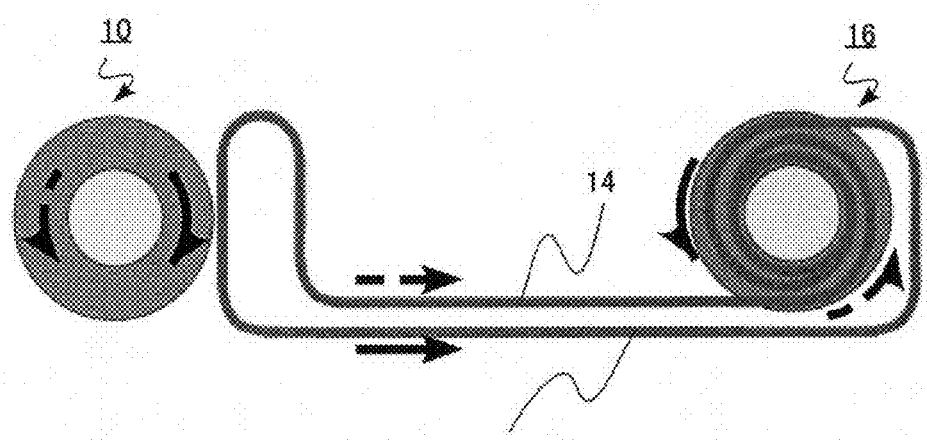
FIG. 3 is a schematic view of a modified example of the optical transmission-reception system according to the first embodiment.

FIG. 3 is a schematic view of a modified example of the optical transmission-reception system according to this embodiment. The arrangement as shown in this modified example is also applicable.

The first and second optical waveguides 12 and 14 have the same length ideally, so that the first and second optical signals have the same phase. The difference in length is preferably within 10% in consideration of the use frequency and light propagation speed of LSIs.

Figure 4:
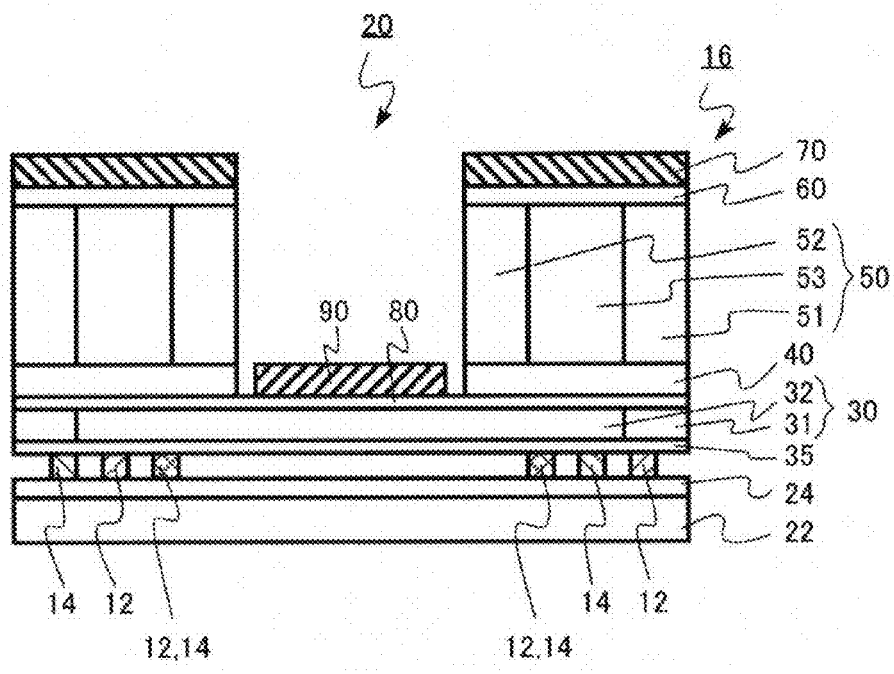
FIG. 4 is a schematic sectional view of a light-receiving unit according to the first embodiment.

FIG. 4 is a schematic sectional view of the light-receiving unit of this embodiment. A light-receiving unit 20 includes the light-receiving element 16, the first optical waveguide 12, and the second optical waveguide 14. Hereinafter, a part of the first optical waveguide 12 and the second optical waveguide 14 that is on the light-emitting element 10 side is called the upstream side, while a part thereof that is on the light-receiving element 16 side is called the downstream side.

In the light-receiving unit 20, each of the first optical waveguide 12 and the second optical waveguide 14 is formed on a part of a dielectric layer 24 provided on a substrate 22. The downstream parts of the first optical waveguide 12 and the second optical waveguide 14 are processed into a spiral shape of at least one round or more, and the ends of the first optical waveguide 12 and the second optical waveguide 14 are combined with the outer circumference.

A lower cladding layer 30 is provided on the first optical waveguide 12 and the second optical waveguide 14 with a junction layer 35 interposed therebetween. A second contact layer 80 is provided on the lower cladding layer 30. An optical absorption layer 40 is provided on the contact layer 80 so as to cover the range of the first optical waveguide 12 and the second optical waveguide 14. An upper cladding layer 50 is provided on the optical absorption layer 40. A first contact layer 60 and an upper electrode 70 are stacked in this order on the upper cladding layer 50. A lower electrode 90 is provided on the inner side surrounded by the optical absorption layer 40 on the second contact layer 80.

Each of the junction layer 35, the lower cladding layer 30, the second contact layer 80, the optical absorption layer 40, the upper cladding layer 50, and the first contact layer 60 is formed using a semiconductor layer. A structure of these semiconductor layers corresponds to the second semiconductor multilayer structure. Each of the junction layer 35, the lower cladding layer 30, and the second contact layer 80 has a disk-like shape, and each of the optical absorption layer 40, the upper cladding layer 50, and the first contact layer 60 has a ring-like shape.

Of the upper cladding layer 50, a side-face part 51 along the outer circumference between the first contact layer 60 and the optical absorption layer 40 and a side-face part 52 along the inner circumference surrounding the space are oxides of a material included in the other part 53 of the upper cladding layer 50. The side-face parts 51 and 52 of the upper cladding layer 50 have a lower refractive index than the other part 53 of the upper cladding layer 50. In the lower cladding layer 30, a side-face part 31 along the outer circumference between the first optical waveguide 12 and the second optical waveguide 14, and the optical absorption layer 40 is an oxide of a material included in the other part of the lower cladding layer 30. The side-face part 31 of the lower cladding layer 30 has a lower refractive index than the other part 32 of the lower cladding layer 30.

The substrate 22 is formed using silicon (Si), for example. The dielectric layer 24 includes a silicon oxide film ($SiO_2$) and has a thickness of 3 μm, for example. Each of the first optical waveguide 12 and the second optical waveguide 14 includes Si and has a thickness of 200 nm and a width of 450 nm in a part thereof outside the light-receiving part, for example. The width is reduced gradually as the spiral shape in contact with the light-receiving part gets close to the end, and the width at the end part, which corresponds to the narrowest part, is 200 nm.

The junction layer 35 includes GaAs and has a thickness of 100 nm, for example. The lower cladding layer 30 except for the side-face part 31 includes AlGaAs, and the side-face part 31 includes $Al_2O_3$. The second contact layer 80 includes, for example, p-type AlGaAs. The optical absorption layer 40 includes a two-layered non-doped GaAs light confinement layer, and an InGaAs/GaAs multiple quantum well layer provided therebetween in which a quantum layer and a barrier layer are alternately stacked. The upper cladding layer 50 except for the side-face parts 51 and 52 includes AlGaAs, and the side-face parts 51 and 52 include $Al_2O_3$, for example. The first contact layer 60 includes n-type GaAs, for example. Each of a first electrode 70 and a second electrode 90 includes AuGe alloy and has a thickness of 20 nm, for example.

The junction layer 35 includes InP and has a thickness of 100 nm, for example. The lower cladding layer 30 except for the side-face part 31 includes InAlAs, and the side-face part 31 includes $Al_2O_3$. The second contact layer 80 includes, for example, p-type InGaAs. The optical absorption layer 40 includes a two-layered non-doped InAlGaAs light confinement layer, and an InAlGaAs/InAlGaAs multiple quantum well layer provided therebetween in which a quantum layer and a barrier layer are alternately stacked. The upper cladding layer 50 except for the side-face parts 51 and 52 includes InAlAs, and the side-face parts 51 and 52 include $Al_2O_3$, for example. The first contact layer 60 includes n-type InP, for example. Each of a first electrode 70 and a second electrode 90 includes AuGe alloy and has a thickness of 20 nm, for example.

After the light input and propagated by the first optical waveguide 12 and the second optical waveguide 14 reach the end part of the spiral shape, the light seeps into the ring-like optical absorption layer 40 coupled with the upper surface thereof to be coupled with the optical absorption layer 40 and then absorbed in the optical absorption layer 40. When the first optical waveguide 12 and the second optical waveguide 14 have a curved line, the light seeps largely out of the waveguide as compared with the case where the line is straight. As a result, the optical coupling and absorption into the optical absorption layer 40 are reinforced.

Figure 5A:
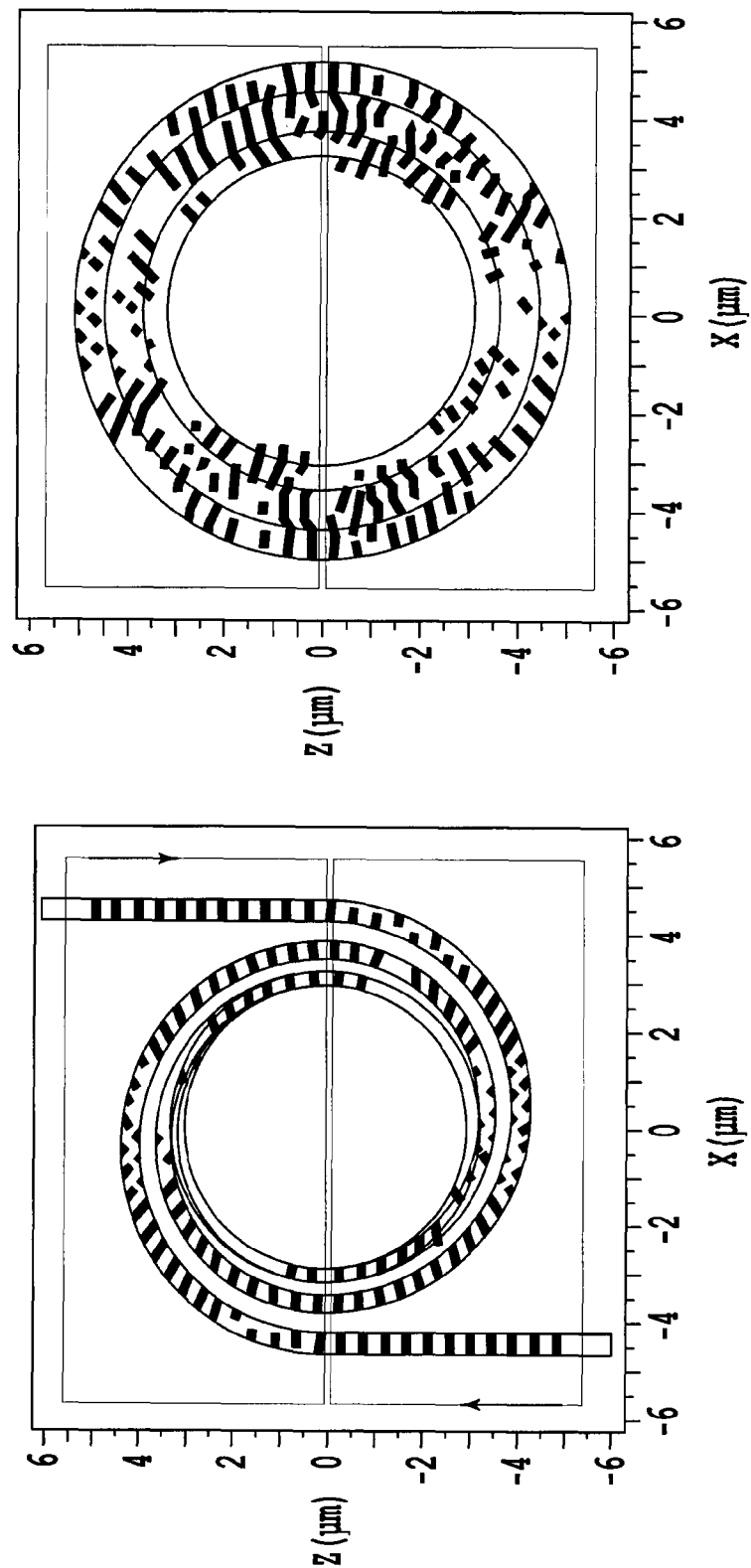
FIGS. 5A and 5B represent analysis results obtained by FDTD (Finite-Difference Time-Domain) method according to the first embodiment.
Figure 5B:
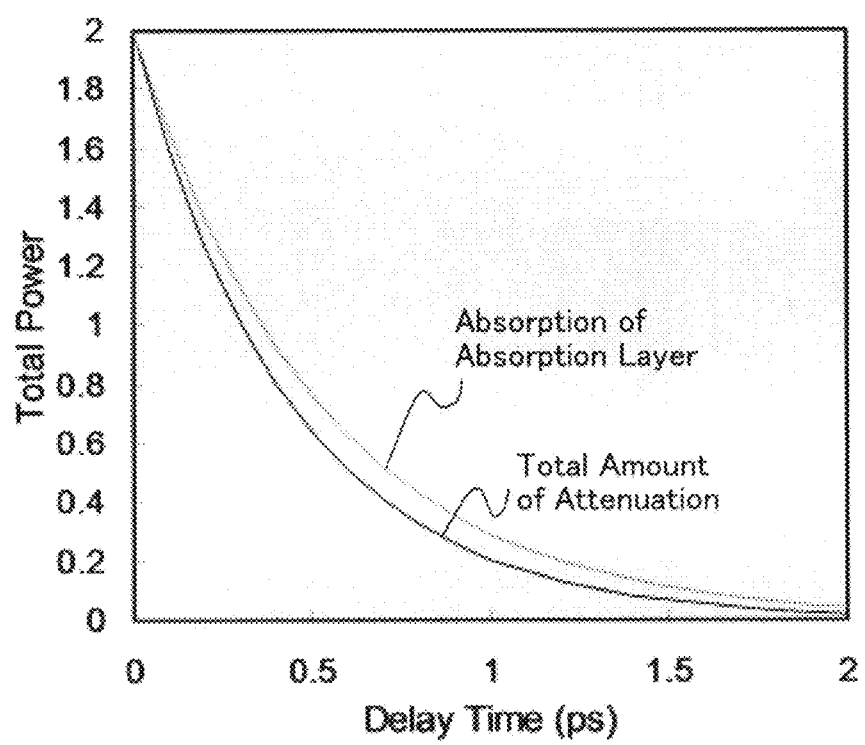

FIGS. 5A and 5B represent the analysis results obtained by FDTD (Finite-Difference Time-Domain) method of this embodiment. A ring-like shape with a diameter of 10 μm is used.

FIG. 5A shows the light intensity distribution of the waveguide (left) and the absorption layer (right). FIG. 5B is a graph showing the absorption into the light-receiving unit relative to the time. In FIG. 5B, the vertical axis represents the total amount of light and the horizontal axis represents the time.

As shown in FIG. 5B, the difference between the amount of absorption and the total amount of attenuation in the absorption layer is small and clearly, the high-efficiency absorption is carried out.

A microring laser has a phenomenon in which the intensity of a light ray rotating clockwise and a light ray rotating counterclockwise in the resonator is not stable and the proportion between the light rays changes depending on the applied voltage or the like. Even in this case, the sum of the both relative to the applied voltage is kept approximately constant.

In the optical transmission-reception system of this embodiment, the optical signal obtained from the light ray rotating clockwise and the optical signal obtained from the light ray rotating counterclockwise are both propagated. Therefore, the optical signal corresponding to the sum of the intensity of the light ray rotating clockwise and the light ray rotating counterclockwise can be propagated. As a result, the propagation of a stable optical signal becomes possible. Moreover, the use of the both optical signals suppresses the loss of light.

When the double-cyclone type light-receiving unit is used, optical absorption with high efficiency becomes possible and high photo-electric conversion efficiency can be achieved. Thus, the optical transmission-reception system that is stable with little loss can be provided.

Second Embodiment

Figure 6:
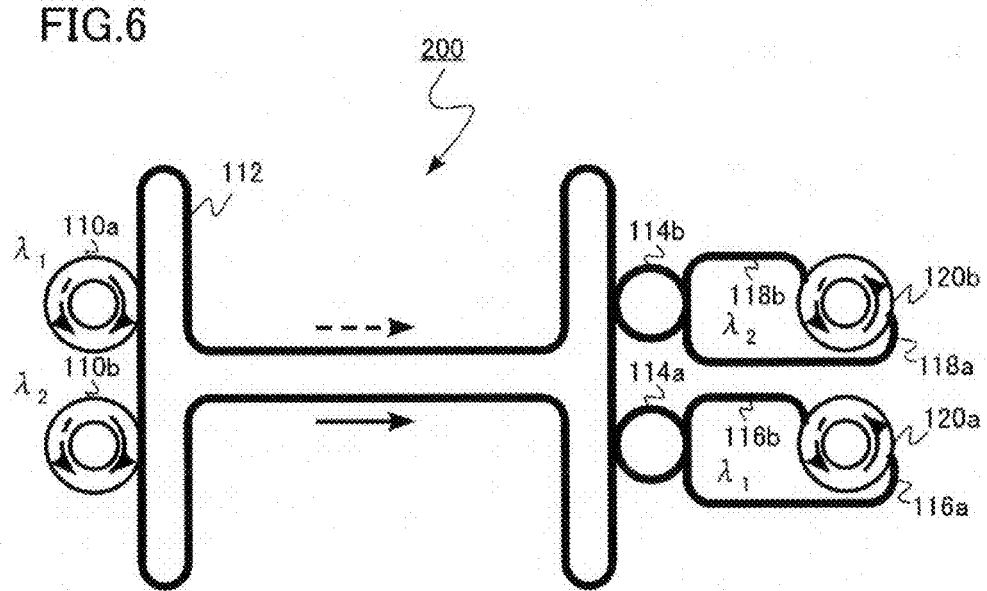
FIG. 6 is a schematic view of an optical transmission-reception system according to a second embodiment.

FIG. 6 is a schematic view of an optical transmission-reception system according to this embodiment. An optical transmission-reception system 200 includes a first light-emitting element 110a having a first semiconductor multilayer structure with a ring- or disk-like shape and generating a first optical signal (solid-line arrow in the drawing) with a first wavelength $\lambda_1$ rotating in the first semiconductor multilayer structure and a second optical signal (dotted-line arrow in the drawing) with the first wavelength $\lambda_1$ rotating in a direction opposite to the first optical signal in the first semiconductor multilayer structure. The optical transmission-reception system 200 also includes a second light-emitting element 110b having a second multilayer structure with a ring- or disk-like shape and generating a third optical signal (solid-line arrow in the drawing) with a second wavelength $\lambda_2$, which is different from the first wavelength $\lambda_1$, rotating in the second semiconductor multilayer structure and a fourth optical signal (dotted-line arrow in the drawing) with the second wavelength $\lambda_2$ rotating in a direction opposite to the third optical signal in the second semiconductor multilayer structure.

Moreover, the optical transmission-reception system 200 also includes an annular optical waveguide 112 which is optically coupled with the first and second light-emitting elements 110a and 110b and which propagates the first and third optical signals in the same direction (solid-line arrow direction in the drawing) and propagates the second and fourth optical signals in a direction opposite to the first and third optical signals (dotted-like direction in the drawing).

In addition, the optical transmission-reception system 200 also includes a first wavelength filter 114a which is optically coupled with the annular optical waveguide 112 and which selects the light with the first wavelength $\lambda_1$ and propagates the selected light, and a second wavelength filter 114b which is optically coupled with the annular optical waveguide 112 and which selects the light with the second wavelength $\lambda_2$ and propagates the selected light. For each of the first and second wavelength filters 114a and 114b, for example, a ring-like waveguide whose waveguide length is optimized in accordance with each wavelength can be used. Alternatively, AWG (Arrayed Waveguide Grating) can be used.

In addition, the optical transmission-reception system 200 also includes a first optical waveguide 116a optically coupled with the first wavelength filter 114a and propagating the first optical signal, a second optical waveguide 116b optically coupled with the first wavelength filter 114a and propagating the second optical signal, a third optical waveguide 118a optically coupled with the second wavelength filter 114b and propagating the third optical signal, and a fourth optical waveguide 118b optically coupled with the second wavelength filter 114b and propagating the fourth optical signal.

In addition, the optical transmission-reception system 200 also includes a first light-receiving element 120a having a third semiconductor multilayer structure with a ring- or disk-like shape, optically coupled with the first and second optical waveguides 116a and 116b, and optically receiving the first and second optical signals, and a second light-receiving element 120b having a fourth semiconductor multilayer structure with a ring- or disk-like shape, optically coupled with the third and fourth optical waveguides 118a and 118b, and optically receiving the third and fourth optical signals.

Here, the first optical waveguide 116a has a spiral shape at the coupling part with the first light-receiving element 120a, and the second optical waveguide 116b has a spiral shape winding in the same direction as the first optical waveguide 120a at the coupling part with the first light-receiving element 120a. Moreover, the third optical waveguide 118a has a spiral shape at the coupling part with the second light-receiving element 120b, and the fourth optical waveguide 118b has a spiral shape winding in the same direction as the third optical waveguide 118a at the coupling part with the second light-receiving element 120b.

In this embodiment, the shapes and the like of the light-emitting element, the light-receiving element, and the optical waveguide at the coupling part are similar to those of the first embodiment. Therefore, the description on the parts similar to those of the first embodiment is omitted.

According to this embodiment, in addition to the effect of the first embodiment, another advantage can be obtained in which the amount of data propagated can be doubled by multiplying the wavelength of the optical signals by using the optical signals having the two wavelengths $\lambda_1$ and $\lambda_2$.

Figure 7:
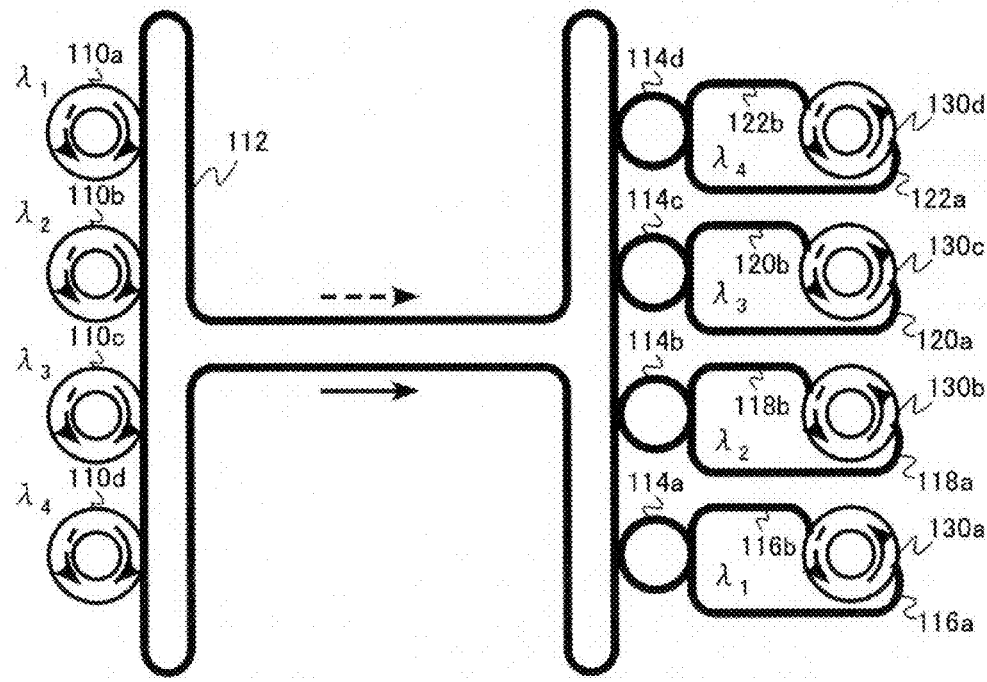
FIG. 7 is a schematic view of a modified example of the optical transmission-reception system according to the second embodiment.

FIG. 7 is a schematic view of a modified example of the optical transmission-reception system of this embodiment. In this modified example, first to fourth light-emitting elements 110a, 110b, 110c, and 110d, first to fourth wavelength filters 114a, 114b, 114c, and 114d, and first to fourth light-receiving elements 130a, 130b, 130c, and 130d are provided. With this structure, optical signals with four different wavelengths $\lambda_1$, $\lambda_2$, $\lambda_3$, and $\lambda_4$ can be propagated.

Accordingly, this modified example can quadruplicate the amount of data propagated. The number of wavelengths used for wavelength multiplexing may be three wavelengths, four wavelengths, or more wavelengths. As the number of wavelengths is increased, the amount of data propagated is increased.

While certain embodiments have been described, these embodiments have been presented by way of example only, and are not intended to limit the scope of the inventions. Indeed, an optical transmission-reception system and a light-receiving unit described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

What is claimed is:

1. An optical transmission-reception system comprising:
a light-emitting element having a first semiconductor multilayer structure with a ring or disk shape, the light-emitting element generating a first optical signal rotating in the first semiconductor multilayer structure and a second optical signal rotating in a direction opposite to the first optical signal in the first semiconductor multilayer structure;
a first optical waveguide optically coupled with the light-emitting element and propagating the first optical signal;
a second optical waveguide optically coupled with the light-emitting element and propagating the second optical signal; and
a light-receiving element having a second semiconductor multilayer structure with a ring or disk shape, the light-receiving element optically coupled with the first and second optical waveguides, and the light-receiving element optically receiving the first and second optical signals, wherein
the first optical waveguide has a spiral shape at a coupling part with the light-receiving element, and
the second optical waveguide has a spiral shape winding in a same direction as the first optical waveguide at the coupling part with the light-receiving element.

2. The system according to claim 1, wherein the spiral shape of each of the first optical waveguide and the second optical waveguide has a ring shaped end part.

3. The system according to claim 1, wherein the first semiconductor multilayer structure and the second semiconductor multilayer structure are formed using a same layer structure.

4. The system according to claim 1, wherein each of the first optical waveguide and the second optical waveguide has a line width which becomes narrower toward an end at the coupling part with the light-receiving element.

5. The system according to claim 1, wherein the first optical waveguide and the second optical waveguide intersect with each other at the coupling part with the light-receiving element.

6. The system according to claim 1, wherein each of the first optical waveguide and the second optical waveguide is formed using silicon and a silicon oxide film surrounding the silicon.

7. A light-receiving unit comprising:
a light-receiving element having a semiconductor multilayer structure with a ring or disk shape;
a first optical waveguide optically coupled with the light-receiving element and having a spiral shape at a coupling part with the light-receiving element; and
a second optical waveguide optically coupled with the light-receiving element and having a spiral shape that winds in a same direction as the first optical waveguide at the coupling part with the light-receiving element, a direction of optical signal propagation of the second optical waveguide being same as a direction of optical signal propagation of the first optical waveguide.

8. The unit according to claim 7, wherein the spiral shape of each of the first optical waveguide and the second optical waveguide has a ring shaped end part, the first optical waveguide and the second optical waveguide convergent into the ring shaped end part.

9. The unit according to claim 7, wherein each of the first optical waveguide and the second optical waveguide has a line width which becomes narrower toward an end at the coupling part with the light-receiving element.

10. The unit according to claim 7, wherein the first optical waveguide and the second optical waveguide intersect with each other at the coupling part with the light-receiving element.

11. The unit according to claim 7, wherein each of the first optical waveguide and the second optical waveguide is formed using silicon and a silicon oxide film surrounding the silicon.

12. The unit according to claim 7, wherein an optical absorption layer of the light-receiving element is provided to cover the spiral shape of the first optical waveguide and the spiral shape of the second optical waveguide, and light seeps into the optical absorption layer from the spiral shape of the first optical waveguide and the spiral shape of the second optical waveguide and absorbed in the optical absorption layer.

13. An optical transmission-reception system comprising:
a first light-emitting element having a first semiconductor multilayer structure with a ring or disk shape, the first light-emitting element generating a first optical signal having a first wavelength and rotating in the first semiconductor multilayer structure and a second optical signal having the first wavelength and rotating in a direction opposite to the first optical signal in the first semiconductor multilayer structure;
a second light-emitting element having a second semiconductor multilayer structure with a ring or disk shape, the second light-emitting element generating a third optical signal having a second wavelength, which is different from the first wavelength, and rotating in the second semiconductor multilayer structure and a fourth optical signal having the second wavelength and rotating in a direction opposite to the third optical signal in the second semiconductor multilayer structure;
an annular optical waveguide optically coupled with the first and second light-emitting elements and propagating the first and third signals in a same direction and the second and fourth optical signals in a same direction and a direction opposite to the first and third optical signals;
a first wavelength filter optically coupled with the annular optical waveguide and selecting light with the first wavelength;
a second wavelength filter optically coupled with the annular optical waveguide and selecting light with the second wavelength;
a first optical waveguide optically coupled with the first wavelength filter and propagating the first optical signal;
a second optical waveguide optically coupled with the first wavelength filter and propagating the second optical signal;
a third optical waveguide optically coupled with the second wavelength filter and propagating the third optical signal;
a fourth optical waveguide optically coupled with the second wavelength filter and propagating the fourth optical signal;
a first light-receiving element having a third semiconductor multilayer structure with a ring or disk shape, optically coupled with the first and second optical waveguides, and optically receiving the first and second optical signals; and
a second light-receiving element having a fourth semiconductor multilayer structure with a ring or disk shape, optically coupled with the third and fourth optical waveguides, and optically receiving the third and fourth optical signals, wherein
the first optical waveguide has a spiral shape at a coupling part with the first light-receiving element,
the second optical waveguide has a spiral shape winding in a same direction as the first optical waveguide at a coupling part with the first light-receiving element,
the third optical waveguide has a spiral shape at a coupling part with the second light-receiving element, and
the fourth optical waveguide has a spiral shape winding in a same direction as the third optical waveguide at a coupling part with the second light-receiving element.

14. The system according to claim 13, wherein the spiral shape of each of the first optical waveguide, the second optical waveguide, the third optical waveguide, and the fourth optical waveguide has a ring shaped end part.

15. The system according to claim 13, wherein the first semiconductor multilayer structure and the second semiconductor multilayer structure are formed using a same layer structure.

16. The system according to claim 13, wherein each of the first optical waveguide, the second optical waveguide, the third optical waveguide, and the fourth optical waveguide has a line width which becomes narrower toward an end at the coupling part with the light-receiving element.

17. The system according to claim 13, wherein the first optical waveguide, the second optical waveguide, the third optical waveguide, and the fourth optical waveguide intersect with each other at the coupling part with the light-receiving element.

18. The system according to claim 13, wherein each of the first optical waveguide, the second optical waveguide, the third optical waveguide, and the fourth optical waveguide is formed using silicon and a silicon oxide film surrounding the silicon.

* * * * *